Nov. 19, 1940.  L. W. MILLER  2,222,112
UTENSIL FOR BAKING BUNS OR THE LIKE
Filed Aug. 3, 1939    2 Sheets-Sheet 1
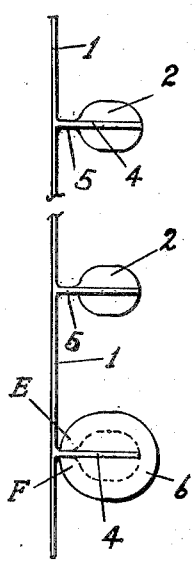
Fig. 1
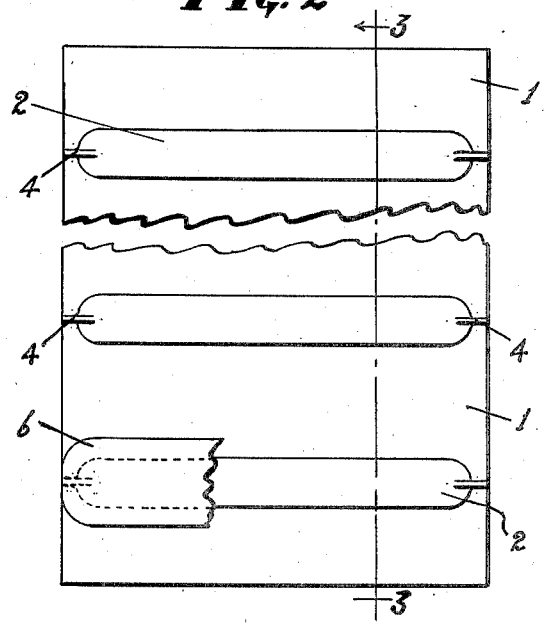
Fig. 2
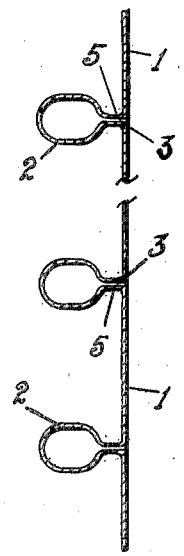
Fig. 3
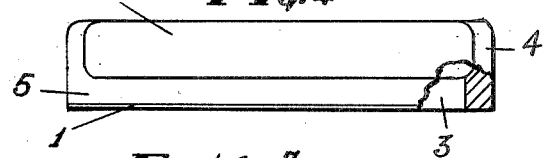
Fig. 4
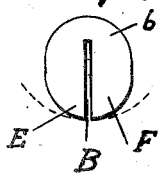
Fig. 5
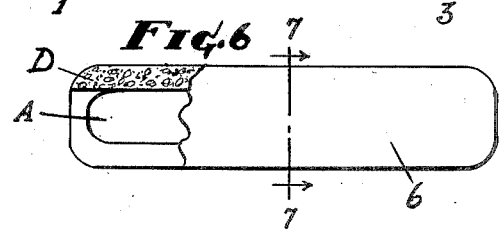
Fig. 6
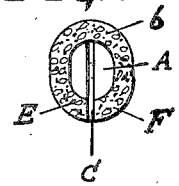
Fig. 7
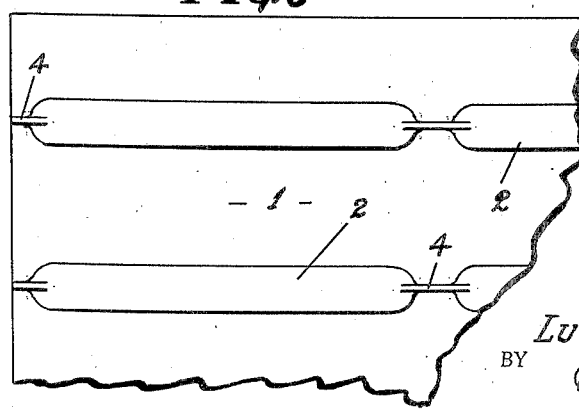
Fig. 8
Fig. 9
INVENTOR.
LUTHER W. MILLER
BY U. G. Charles
ATTORNEY.

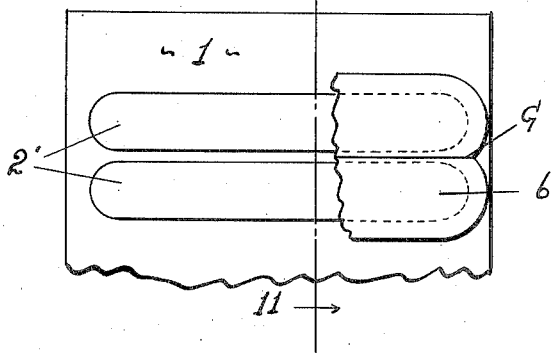
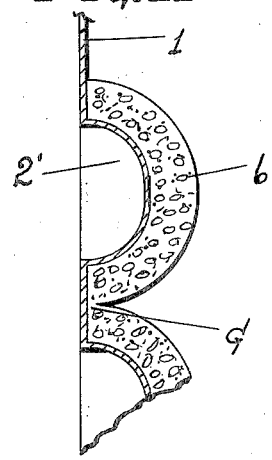
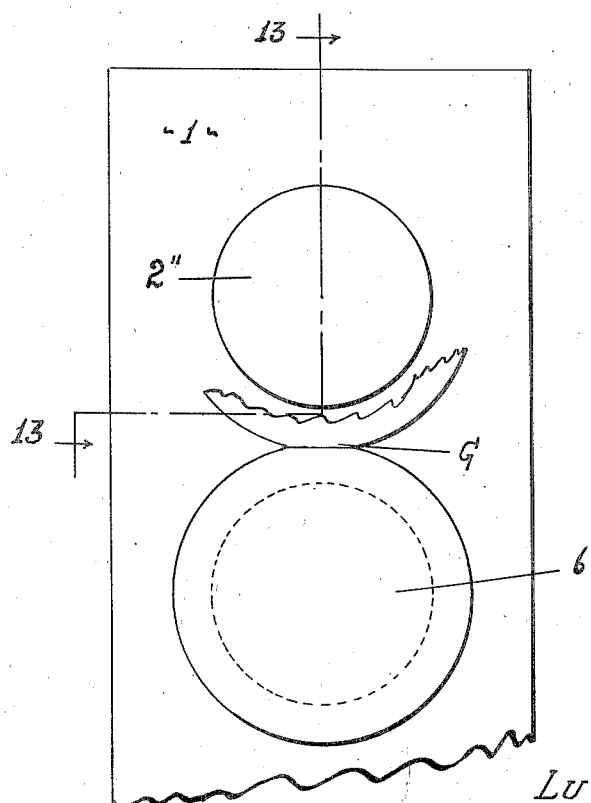
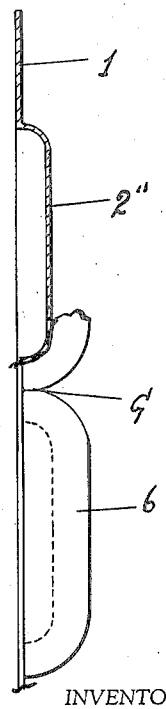
INVENTOR.
LUTHER W. MILLER
BY
ATTORNEY.

Patented Nov. 19, 1940

2,222,112

UNITED STATES PATENT OFFICE 2,222,112

UTENSIL FOR BAKING BUNS OR THE LIKE

Luther W. Miller, Wichita, Kans.

Application August 3, 1939, Serial No. 288,169

5 Claims. (Cl. 53—6)

My invention relates to new and useful improvements in a utensil for baking buns or the like and has for its principal object the provision of a form or series of forms whereby buns are made hollow and being split partially in the process of baking, and adapted to open and close to receive edibles in the hollows of the buns.

A further object of my invention is to provide a form for baking buns or the like whereby the interior thereof is baked simultaneously with the exterior; and furthermore the bun being so baked consists of two sides joined along one edge to function as a hinge, whereby the sides may be rocked to and from each other to receive edibles therebetween.

A still further object of my invention is to provide a baking utensil for buns or the like whereby the bun is made hollow to receive its edible contents, the bun being so formed is economy in quantity of the dough and means to reduce excess bread about the edible.

A still further object of my invention is to provide a utensil for baking buns or the like in such a way as to provide a concavity for the bun, the marginal rim around the concavity adapted to fit closely to retain finely comminuted or a gelatin-like substance as the bun with its contents is being consumed by eating the same.

These and other objects will hereinafter be more fully explained, reference being had to the accompanying drawings forming a part of this specification, in which like characters will apply to like parts in the different views.

Referring to the drawings:

Fig. 1 is an edge view of the utensil fragmentarily showing the position of one bun.

Fig. 2 is a plan view of the utensil and fragmentary portion of a bun, parts removed for convenience of illustration.

Fig. 3 is a sectional view taken on line 3—3 of Fig. 2.

Fig. 4 is an end view of the utensil, parts removed for convenience of illustration.

Fig. 5 is an end view of a bun.

Fig. 6 is a side view of a bun partly in section.

Fig. 7 is a sectional view taken on line 7—7 in Fig. 6.

Fig. 8 is a modification of the utensil fragmentarily illustrated.

Fig. 9 is a modified form for a bun as seen at its opening side.

Fig. 10 is a modification of the utensil to bake the bun in halves.

Fig. 11 is an enlarged sectional view taken on line 11—11 in Fig. 10.

Fig. 12 is a modification of the utensil to bake a bun in circular halves.

Fig. 13 is an edge view partly in section taken on line 13—13 in Fig. 12.

My invention herein disclosed relates to a utensil for baking buns or the like. The utensil consists of a plate 1 aligned on a single plate and having formed thereon a plurality of hollow core elements 2, said elements being integrally joined to the plate, in other words, the utensils may be constructed of a single piece of sheet-like structure, there being an elongated slot 3 from end to end of each core whereby heat is introduced from beneath the plate so that the interior of each core is brought to an efficient degree of baking temperature. Each end of said core elements is closed and has a web 4 axially directed and extending from the plate portion upward to the extremity of the core, by which means a sheet of dough enveloping the core will be split at each end thereof and extending longitudinal along the neck of the core.

The core of the utensil being thus formed is means to produce a hollow A in the dough of a bun 6 when placed thereon while the neck and flange ends are means to sever the bun as at B and C, in other words, retain a separation at each end and along the lower side as above stated, while the portion of the opposite side as at D, is closed but free to flex when the sides E and F are moved toward and from each other as shown by dotted lines in Fig. 5, by which arrangement the bun may be opened to receive an edible in the hollow thereof, and when closed the contents are practically sealed and retained while the bun is being consumed by a patron.

In Figs. 10 and 11 is shown the utensil having a pair of elongated cores 2' spaced apart and in parallelism, each core to form the hollow in its respective half of the bun as shown in Fig. 11; being so baked the halves may be rocked to register with each other and remain intact in the center as at G.

A similar modification is shown in Figs. 12 and 13, in which case circular buns may be baked in halves separately, the core 2" protruding and being disc-like in contour, said halves being placed together in registry when the hollow thereof is filled with a desirable edible whereby a well-known sandwich is made, and the same result is obtained when the bun is formed as shown in Figs. 10 and 11.

While I have shown and described a baking utensil for buns or the like being made of sheet metal I do not wish to be restricted to such alone as the cores may be otherwise formed with respect to the interior and exterior of each so long as the structure maintains a hollow in the bun and severs its ends and one side for the purpose disclosed, and material varying from sheet metal may be considered as the utensil for its general function may be cast eliminating the use of dies, welding or other principles required in sheet-metal construction, also the contour of the bun may be varied externally by placing and kneading the dough of each bun on its core to a desired form, and such other modifications may be made as lie within the scope of the appended claims.

Having fully described my invention on what I claim as new and desire to secure by Letters Patent is:

1. In a utensil for baking buns or the like, a plate and means carried by the plate on which dough will be placed, means coacting with the first said means to sever the bun at its ends and along one side, the severed portions being on the same plane and radially extending from the hollow of the bun as accessible means to the hollow when the bun is opened at its severed portion.

2. In a utensil for baking buns or the like, a baking utensil for hollow buns comprised of a plate, a core of an appropriate length and means to connect the core to the plate, and means secured to each end of the core outwardly extending therefrom, each of said means adapted to sever the dough when placed on the core whereby a bun when baked on the utensil is made hollow and having one side and each end severed to open as accessible means to the hollow by rocking movement of said portions.

3. In a utensil for baking buns or the like, a hollow core of an appropriate diameter and length, means extending from each end and along one side as severing means for dough enveloping the core at its corresponding ends and side with respect to said means, and means to support said core during a period required to bake the dough in an appropriate oven.

4. In a utensil for baking buns or the like, a plate having a series of extensions spaced along one side of the plate, each extension having a neck as connecting means to the plate, a web outwardly extending from each end of each extension, said webs axially extending and of equal width to that of the extension and being connected to the plate at one edge thereof, being so arranged that when dough is placed on the extension and over the neck and end webs a hollow bun is formed when the dough is baked, the bun being severed at each end by its respective web and one side by its neck, the opposite side functioning as a hinge to permit opening and closing of the sides of the bun for the purpose specified.

5. In a utensil for baking buns or the like, a baking utensil of the class described, the utensil being made of a single sheet of metal by bending the same, whereby hollow elongated cores are formed outwardly extending from one side of the sheet and joined thereto by a neck through which a slot extends communicating with the hollow of the core, each end of said cores being closed, and a web extending across each end and outward therefrom longitudinally and being joined to the sheet all substantially as shown for the purpose specified.

LUTHER W. MILLER.